No. 628,314. Patented July 4, 1899.
J. H. GUNN.
THRUST BEARING FOR GRINDING MILLS.
(Application filed Dec. 11, 1897.)
(No Model.)
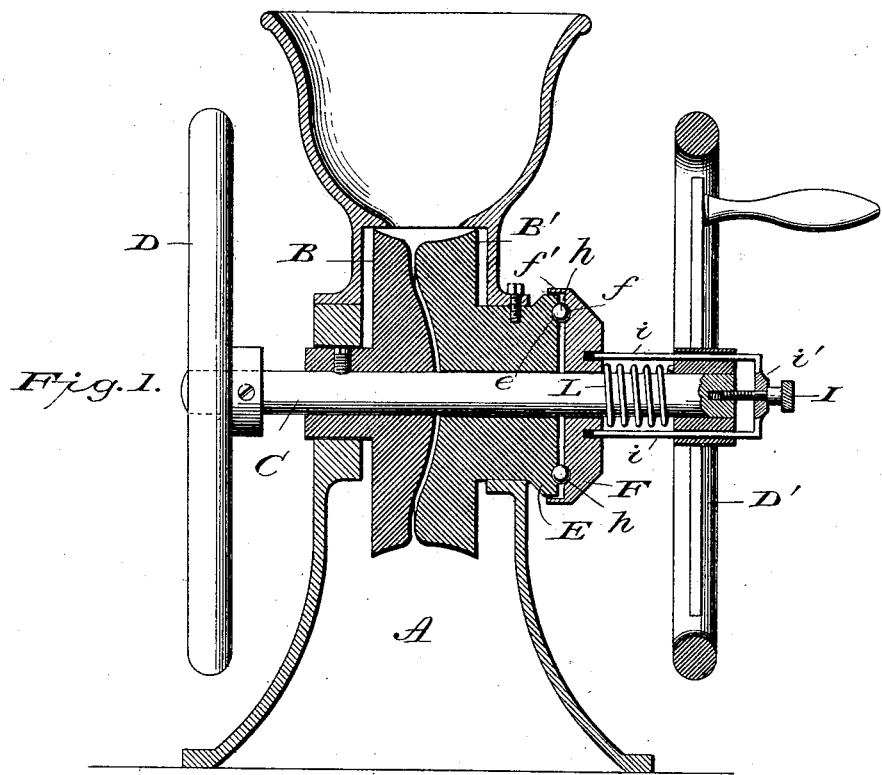
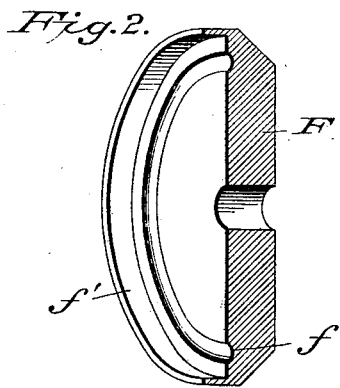
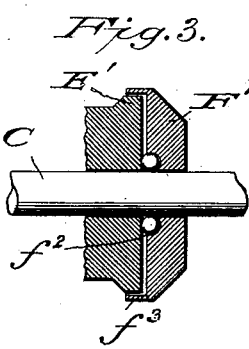
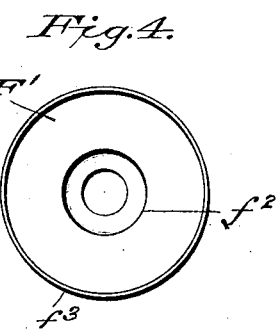
WITNESSES
L. S. Elliott
A. W. T. Beall
Joseph H. Gunn,
INVENTOR,
By John B. Thomas & Co.
Attorneys
THE NORRIS PETERS CO., PHOTO-LITHO., WASHINGTON, D. C.

UNITED STATES PATENT OFFICE.

JOSEPH H. GUNN, OF McLEAN, NEW YORK.

THRUST-BEARING FOR GRINDING-MILLS.

SPECIFICATION forming part of Letters Patent No. 628,314, dated July 4, 1899.

Application filed December 11, 1897. Serial No. 661,572. (No model.)

*To all whom it may concern:*

Be it known that I, JOSEPH H. GUNN, a citizen of the United States of America, residing at McLean, in the county of Tompkins and State of New York, have invented certain new and useful Improvements in Thrust-Bearings for Grinding-Mills; and I do hereby declare the following to be a full, clear, and exact description of the invention, such as will enable others skilled in the art to which it appertains to make and use the same.

My invention is an improvement in ball-bearings for shafts to reduce to a minimum the end thrust or friction occasioned by the pressure of the shaft in the direction of its length, the primary object of my said invention being to provide such an antifriction-bearing for grinding-mills and so construct and arrange the parts constituting the same as to prevent the balls from falling out, particularly where one part is adjustable or movable with respect to the other.

To the accomplishment of this end the invention consists in the particular construction and combination of the parts constituting the preferred form of bearing.

The following specification enters into a detail description of my invention, and what I claim as an improvement in the art is more particularly set forth in the appended claim.

In the accompanying drawings, which form a part of this specification, Figure 1 is a sectional view showing the application of my invention to a coffee-mill. Fig. 2 is a detail view of the movable bearing-ring. Fig. 3 is a sectional view of a modification of the invention. Fig. 4 is an elevation of the movable bearing-ring in Fig. 3.

As illustrating the application of my improvements in thrust-bearings I have shown the same in connection with a coffee-mill, in which A designates the body of the mill, inclosing the grinding-cones B and B', and C the shaft, which passes through the body of the mill and carries the grinding-cone B fixed thereto, while balance-wheels D D' are keyed upon the ends of said shaft, as shown. The shaft is adjustable longitudinally, as hereinafter described, to provide for the adjustment of the grinding-cone B with respect to the cone B' in adjusting the mill.

E designates a stationary bearing-ring which is rigidly secured to or formed integral with the cone B' and made fast to the body of the mill, and in the outer face of this ring is an annular groove or ball-run $e$, surrounding the shaft. The said ring forms one of the bearings to receive the end thrust of the shaft, the other bearing consisting of a ring or collar F, loosely mounted upon the shaft and having an annular groove or ball-run $f$ opposed to the ball-run $e$, and interposed between these bearing-rings, within the aforesaid grooves, is a set of balls $h$, which reduce the friction. The ring F turns with the shaft C and is loosely mounted upon said shaft to permit of an adjustment of the shaft and a corresponding adjustment of the cone B, carried thereby, the said shaft being adjusted by means of rods $i$ $i$, fitting loosely in openings in the outer side of the ring F, being passed through the hub of the balance-wheel D' and connected at their outer ends by a cross-piece $i'$, a thumbscrew I turning within an opening in said cross-piece and screwed into the end of the shaft. It will be noted that the rods $i$ $i$ are carried by the shaft and are adjustable with respect thereto, so that the extent of longitudinal adjustment of said shaft is determined by contact of said rods with the inner ends of the recesses in the bearing-ring F. As shown in the drawings, the bearing-ring F is forced against the stationary ring E by the spring, while the movable grinding-cone and its shaft are not moved to the limit to which they have been adjusted. Therefore when material is introduced between the grinding-cones they will be separated to the extent of the movement of the movable cone, which movement is limited by the rods $i$ abutting against the inner ends of the recesses in the bearing-ring F. It will be seen, therefore, that the bearing-ring F will at all times be held closely against the stationary bearing-ring E by means of the helical spring L, which encircles the shaft and is interposed between the bearing-ring F and hub of the balance-wheel D'. Thus said bearing-ring F serves to positively hold the balls in place irrespective of the movements of the shaft carrying the adjustable cone. The cone B being fast to the shaft is adjusted by an adjustment of said shaft through the intervention of the rods $i$ $i$ and screw I, carried by said shaft.

The bearing-ring F is provided with a projecting rim or flange $f''$, which overlies the periphery of the other ring, for the purpose of excluding dust from the bearing-surfaces, the said bearing-rings being beveled at their edges to more effectually attain this end.

In Figs. 3 and 4 of the drawings I have shown a modified construction for holding the balls in place, which consists in providing a bearing-ring F', loosely mounted upon the shaft and similar to ring F, said bearing-ring F' having an inwardly-projecting flange $f^3$ at the outer edge of the ring. In this modification of the invention the ball-run $f^2$ immediately surrounds the opening for the shaft, leaving an opening communicating with the shaft-opening, in order that the balls may be inserted before the shaft is passed entirely through the ring.

Though I have shown and described my improved thrust-bearing as applied to a coffee-mill, it will be understood that the invention could be applied to any mill where it is desired to reduce the friction occasioned by pressure in the direction of the length of the shaft, the particular construction and arrangement of the parts serving to retain the balls in place even though the shaft may be moved longitudinally.

Having thus described my invention, what I claim as new, and desire to secure by Letters Patent, is—

In a thrust-bearing for grinding-mills, the combination with the stationary grinding-cone, movable shaft extending therethrough, and grinding-cone fixed to the shaft to be movable therewith, the said shaft having a balance-wheel on its outer end, of a bearing-ring formed integrally with the stationary grinding-cone; a bearing-ring movable on the shaft, said bearing-rings having opposing annular grooves; balls interposed between the bearing-rings and seated within the grooves, and a helical spring encircling the shaft and interposed between the movable bearing-ring and the balance-wheel; together with rods passed through the balance-wheel and connected at their outer ends by a cross-piece, and a set-screw passed through the cross-piece and engaging a threaded opening in the end of the shaft, as shown and for the purpose set forth.

In testimony whereof I affix my signature in presence of two witnesses.

JOSEPH H. GUNN.

Witnesses:
 FRED. H. SANFORD,
 D. W. ROWLY.